(12) United States Patent
Baxter (10) Patent No.: US 10,480,668 B2
(45) Date of Patent: Nov. 19, 2019

(54) TANK OVERHEAD LINE LIQUID BACKFLOW RESTRICTION DEVICE

(71) Applicant: Jesse Baxter, Mobile, AL (US)

(72) Inventor: Jesse Baxter, Mobile, AL (US)

( * ) Notice: Subject to any disclaimer, the term of this patent is extended or adjusted under 35 U.S.C. 154(b) by 60 days.

(21) Appl. No.: 15/919,502

(22) Filed: Mar. 13, 2018

(65) Prior Publication Data

US 2018/0266578 A1 Sep. 20, 2018

Related U.S. Application Data

(60) Provisional application No. 62/471,270, filed on Mar. 14, 2017.

(51) Int. Cl.
| | | |
|---|---|---|
| *F16L 55/00* | (2006.01) | |
| *F16K 24/04* | (2006.01) | |
| *F16K 17/19* | (2006.01) | |
| *B60P 3/22* | (2006.01) | |
| *B65D 90/52* | (2006.01) | |
| *B65D 88/12* | (2006.01) | |
| *F16L 55/027* | (2006.01) | |

(52) U.S. Cl.
CPC ............ *F16K 24/04* (2013.01); *B60P 3/2215* (2013.01); *B60P 3/2235* (2013.01); *B60P 3/2245* (2013.01); *B60P 3/2265* (2013.01); *B65D 90/52* (2013.01); *F16K 17/19* (2013.01); *B60P 3/2255* (2013.01); *B65D 88/128* (2013.01); *F16L 55/027* (2013.01)

(58) Field of Classification Search
CPC . F16L 55/02736; B01F 5/0604; B01F 5/0682; B01F 5/0688

USPC ....................... 138/41, 42, 44; 366/336, 340
See application file for complete search history.

(56) References Cited

U.S. PATENT DOCUMENTS

| | | | | |
|---|---|---|---|---|
| 1,915,867 | A * | 6/1933 | Penick | F16L 55/02736 138/42 |
| 1,947,586 | A * | 2/1934 | Fletcher | E21B 34/02 138/42 |
| 2,194,946 | A * | 3/1940 | Kunstorff | F16T 1/34 137/177 |
| 3,128,899 | A | 4/1964 | Runo | |
| 3,526,391 | A * | 9/1970 | Church, Jr. | B01F 5/0604 366/340 |
| 3,782,694 | A * | 1/1974 | Shano | B01F 5/0604 366/340 |
| 3,856,270 | A * | 12/1974 | Hemker | B01F 5/0604 366/340 |
| 4,514,095 | A * | 4/1985 | Ehrfeld | F16L 55/02718 138/42 |
| 5,327,941 | A * | 7/1994 | Bitsakis | B01F 5/0682 138/42 |

(Continued)

*Primary Examiner* — Patrick F Brinson
(74) *Attorney, Agent, or Firm* — Adamsip, LLC; Stephen Thompson; J. Hunter Adams (57) ABSTRACT

A device for restricting liquid backflow through an overhead line on a tank and a method of using the device are provided. The device has a tubular housing with spaced internal baffle plates. The device is secured in place in the interior of an overhead pipe on the top of a tank on a tank truck or other vehicle used for transporting bulk liquid cargo. The device prevents liquid backflow from entering overhead piping due to sloshing action of the liquid during transport. The device allows air to flow through the device so that air may be supplied to the tank, as well as vented from the tank, through the device.

17 Claims, 4 Drawing Sheets

(56) References Cited

U.S. PATENT DOCUMENTS

| | | | | |
|---|---|---|---|---|
| 5,356,565 A | * | 10/1994 | Southwell | B01F 5/0406 |
| | | | | 166/309 |
| 6,722,780 B2 | * | 4/2004 | Stein | A61K 9/1075 |
| | | | | 138/40 |
| 2011/0305104 A1 | * | 12/2011 | McGuire | B01F 5/0619 |
| | | | | 366/337 |

* cited by examiner

TANK OVERHEAD LINE LIQUID BACKFLOW RESTRICTION DEVICE

CROSS REFERENCES

This application claims the benefit of U.S. Provisional Application No. 62/471,270, filed on Mar. 14, 2017, which application is incorporated herein by reference.

FIELD OF THE INVENTION

The present invention relates to a device for restricting liquid backflow through an overhead line on a tank and a method of using the device.

BACKGROUND

Tank trucks, also known as tanker trucks or simply tankers, are a common type of transport vehicle used for transporting bulk liquid cargo, which may include petroleum products, industrial chemicals, or other products that may pose a risk to health, safety, or the environment. When liquid cargo is transported, the liquid is first loaded into a tank on the tank truck at the place of origin and then unloaded from the tank at the destination of the cargo. To unload liquid cargo, a valve is opened on an offloading line located on the bottom of the tank. A temporary air supply line is typically connected to the top of the tank for supplying air to the tank. Air is supplied to the tank to pressurize the tank in order to facilitate offloading of liquid cargo and to prevent a vacuum on the tank when unloading liquid cargo. Supplied air may be later vented from the tank through the overhead air supply line after disconnecting the temporary air line. Tank trucks typically have piping that connects to the top of the tank and extends down to a low point on the tank truck where an operator can access the piping without climbing onto the top of the tank truck. The piping has a valve and a connection at the low point for hooking up the temporary air line at an offloading site for supplying air to the tank during offloading.

A problem commonly experienced during the transporting of liquid cargo in tank trucks or other transport vehicles is sloshing of the liquid in the tank during transportation due to motion of the vehicle. The sloshing motion of the liquid inside the tank may cause some liquid to backflow into the opening to the air supply piping connected to the top of the tank. Once in the piping, some liquid may then gravity flow to the low point of the piping where operators connect temporary air lines to the piping for supplying air to the tank. Any accumulated liquid at the low point will remain in the piping until drained. This accumulated liquid in the air supply piping may cause operational problems with the system. For instance, in cold weather the liquid may freeze inside the pipe, which may block the flow of air to be supplied to the tank during offloading. This is particularly a problem with aqueous solutions such as caustic. Additionally, operators may be exposed to potentially hazardous liquids when opening the valve in the piping at the low point to connect an air line to the piping, which may pose a health and safety risk to the operator. Some tanks may have a valve located on the air line at the top of the tank, which may prevent sloshing liquid from accumulating in overhead piping. However, this valve is often intentionally left open by operators due to the inconvenience of having to climb onto the top of the tank truck to open the valve before offloading and to close the valve prior to transporting cargo. At times, this valve may also be left open inadvertently, thereby creating a safety risk.

Accordingly, there is a need in the art for a device for restricting liquid backflow through overhead piping during transportation on a transport vehicle due to liquid sloshing. Additionally, there is a need in the art for a device for restricting liquid backflow through overhead piping without requiring the manual closing of a valve on the top of a tank containing the liquid. Additionally, there is a need in the art for a method for restricting liquid backflow through overhead piping during transportation on a transport vehicle due to liquid sloshing.

SUMMARY

In one aspect, a device for restricting liquid backflow through an overhead line on a tank is provided. The device my be retrofitted to existing piping on a tank secured to a transport vehicle, such as a tank truck or a railroad tank car, for restricting backflow into overhead piping due to liquid sloshing during transportation. The device restricts liquid backflow but also allows air to flow through the device for supplying air to the tank for unloading liquid cargo, as well as for venting air from the tank when loading liquid into the tank. The device is configured to be removably secured in a fixed position within an interior of an overhead pipe connected to a top side of the tank and in fluid communication with the interior of the tank where the liquid cargo is contained. Thus, the device may be installed inside an existing pipe and may be removed for cleaning or replacement, as necessary.

The device comprises a tubular housing and a plurality of baffle plates disposed within an interior of the housing. Each baffle plate has at least one aperture therethrough and preferably has multiple apertures. In a preferred embodiment, the device has four spaced baffle plates each with four apertures, and the apertures in each plate are offset from each other so that the apertures in adjacent baffle plates are not longitudinally aligned with each other.

When installed, the device is secured within a vertical section of pipe connected to the top side of the tank. The device optionally has an end cap configured to removably secure to a bottom end of the device when installed in a vertical position, wherein the cap has at least one opening therein to allow air to pass through. Thus, when a wave of sloshing liquid moves upward in the tank and contacts the device, the liquid will first contact the end cap before entering the interior of the device. The liquid must then flow through the apertures of each of the plurality of baffle plates before the liquid may enter the overhead piping connected to the top of the tank. Thus, due to the baffle plates successively restricting flow, the sloshing action of the liquid will not result in liquid backflow entering into overhead piping during the transportation of liquid cargo. However, air may flow through the device in either direction by flowing through the apertures in the baffle plates and the openings in the end cap.

The device may be installed by inserting the device downward into an open end of a vertical section of an overhead pipe connected to a tank that is secured to a transport vehicle. To secure the device in place within the overhead pipe, the device may have an external flange disposed around a top end of the device. The device may be inserted into the pipe until the flange contacts a top edge of the pipe, and a piping or vent cover may then be installed on the pipe with the device in place. When the device is installed, the flange is fitted securely between the overhead pipe and the cover to hold the device in a fixed position within the pipe. Thus, the flange prevents the device from moving downward through the vertical pipe and falling into the tank. The cover has piping connected thereto for supplying air to the tank and for venting supplied air from the tank. Once the device and cover are installed, supplied air can flow through the device in both directions. Thus, air may be supplied to the tank through the device and then vented from the tank through the device, as needed.

The device preferably also includes a set of flexible supports attached to an exterior surface of the tubular housing. The supports are resiliently biased in an outward radial direction. When the device is inserted into an overhead pipe, the supports contact an interior surface of the pipe to assist in securing the device in a fixed position within the interior of the pipe. The supports may limit both rotational movement and longitudinal movement of the device within the pipe.

Accordingly, an object of the present invention is to provide a device that may be installed in a tank overhead line and that restricts backflow of liquid contained in the tank from entering into overhead piping due to liquid sloshing during transportation. Another object of the present invention is to provide a device that may be installed in a tank overhead line that allows supplied air to flow into the tank and to be vented from the tank through the device. Another object of the present invention is to provide a method for restricting liquid backflow through an overhead pipe on a tank secured to a transport vehicle during transportation of liquid cargo.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As used herein, the term "removably secured" or grammatical equivalents means that a component may be secured in a fixed position to a second component and removed from the second component without causing structural damage to either component. As used herein, the term "backflow" refers to liquid flowing upward into a tank overhead pipe due to liquid sloshing in the tank.

Turning now to the drawings, FIGS. 1-6 illustrate a preferred embodiment of a device 10 for installation in an overhead pipe 62 on a tank 60. The device restricts liquid backflow through overhead pipes and may be installed on tanks used in transporting bulk liquid cargo, such as tanks secured to tank trucks or tank cars. The device my be retrofitted to an existing overhead pipe that is connected to a top side of a tank and in fluid communication with the interior of the tank where the liquid cargo is contained. The device restricts the backflow of liquid from entering overhead piping due to sloshing action of the liquid during transportation, but allows addition of supplied air into the tank through the device, as well as venting of air from the tank. The device is configured to be removably secured in a fixed position within an interior of an overhead pipe so that the device may be installed inside an existing pipe and may be removed for cleaning or replacement, as necessary.

Figure 1:
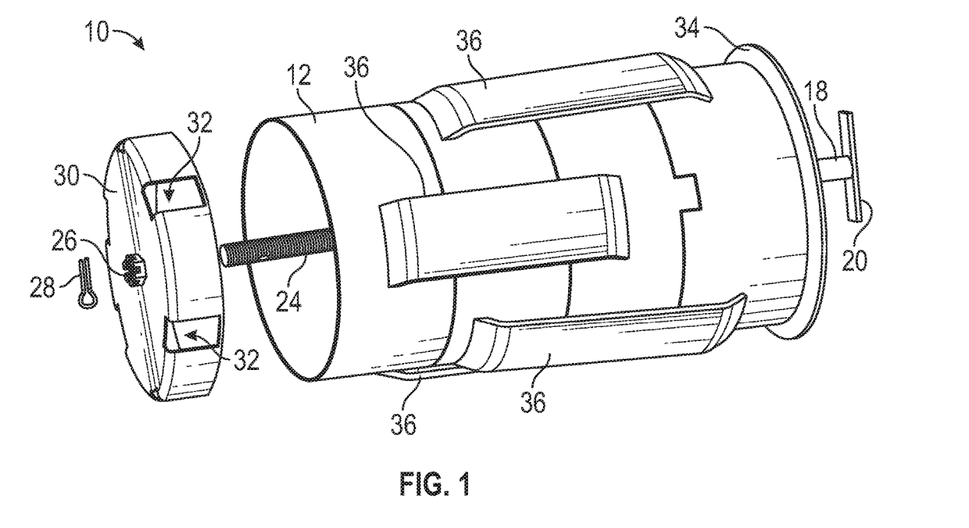
FIG. 1 shows a perspective view of a device for restricting backflow through an overhead line on a tank in accordance with the present disclosure.
Figure 2:
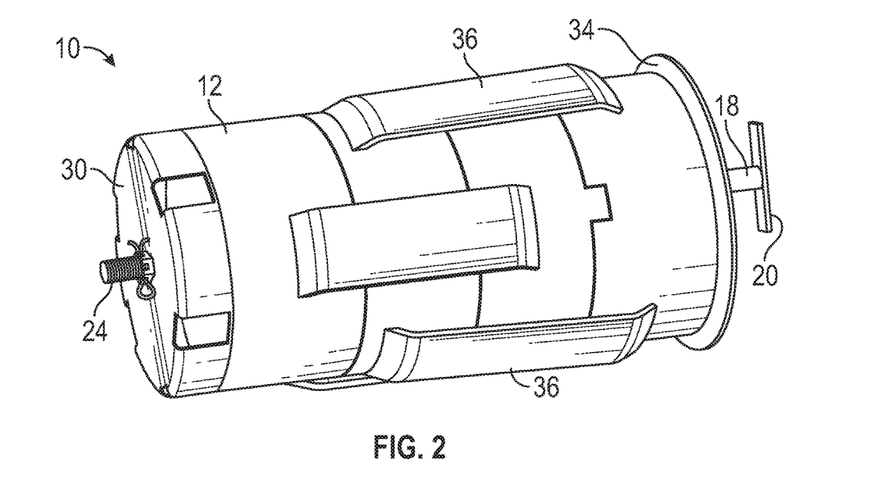
FIG. 2 shows a perspective view of a device for restricting backflow through an overhead line on a tank in accordance with the present disclosure.
Figure 3:
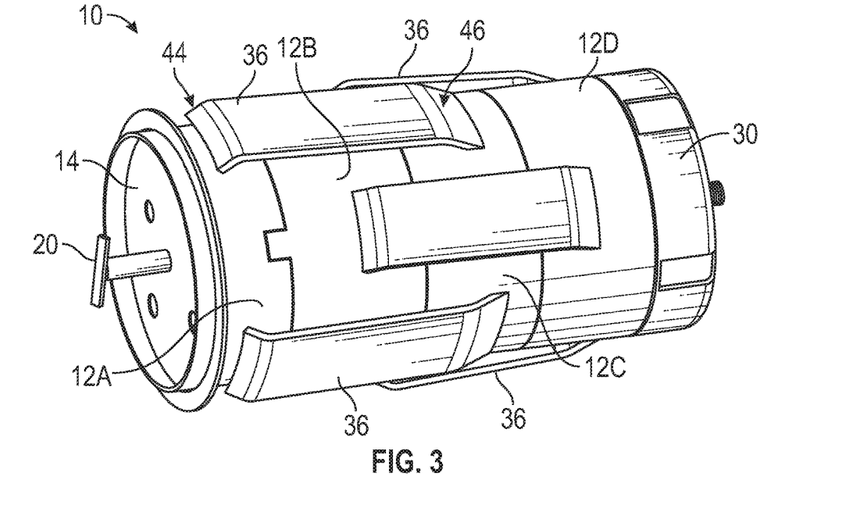
FIG. 3 shows a perspective view of a device for restricting backflow through an overhead line on a tank in accordance with the present disclosure.
Figure 4:
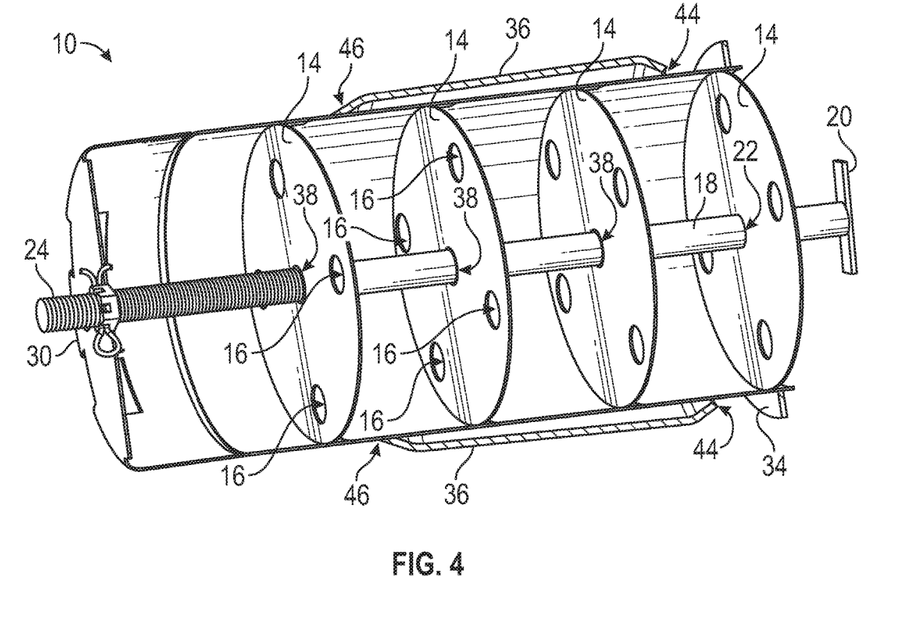
FIG. 4 shows a partial cross-sectional view of a device for restricting backflow through an overhead line on a tank in accordance with the present disclosure.

The device 10 comprises a tubular housing 12 and a plurality of baffle plates 14 disposed within an interior of the housing 12. FIGS. 1-3 show the exterior of the device, and FIG. 4 shows a partial view of the device showing the internal baffle plates 14. Each baffle plate 14 has at least one aperture 16 therethrough and preferably has multiple apertures. In a preferred embodiment, the device has four spaced baffle plates 14 each having four apertures 16. Preferably, the apertures 16 in adjacent baffle plates 14 are offset from each other so that the apertures 16 are not longitudinally aligned with the apertures 16 in an adjacent baffle plate, as best seen in FIG. 4.

Figure 6:
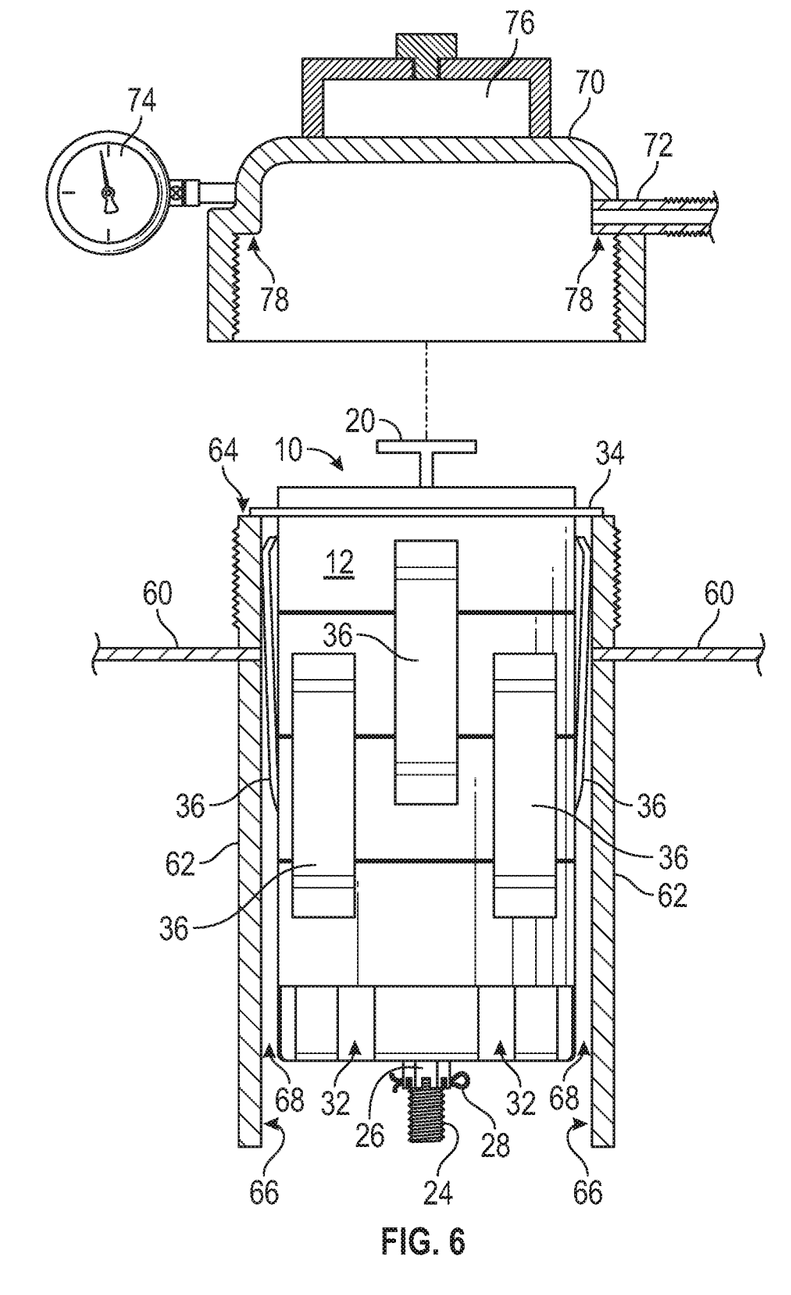
FIG. 6 shows a partial cross-sectional view of a device for restricting backflow through an overhead line on a tank in accordance with the present disclosure, wherein the device is installed in an overhead pipe on a tank.

The device 10 is configured to be removably secured in a fixed position within an interior of a pipe. Thus, the device may be installed inside an existing pipe and may be removed for cleaning or replacement, as necessary. FIG. 6 illustrates the device 10 installed within a vertical overhead pipe 62 connected to a top side of a tank 60. FIG. 6 shows a partial cross-sectional view illustrating only a portion of a top side 60 of an enclosed tank with a vertical segment of pipe 62 that may serve as a combination vent for both pressure relief and vacuum relief for the tank. On tank trucks, the pipe 62 typically extends vertically down into the tank 60 for a distance of about four to five inches and above the top of the tank for a distance of about three inches. As shown in FIG.

6, the portion of the pipe 62 extending above the top of the tank 60 typically has male threads, and a cover 70 having female threads may be secured to the top of the pipe 62 by threading the cover 70 onto the male threads. The cover 70 may be removed from the pipe 62, as is shown in FIG. 6. The cover 70 has an air line 72 connected thereto for supplying air to the tank 60 and for venting the tank. The cover 70 may have a vacuum relief diaphragm 76 that provides vacuum relief in the event that a vacuum is pulled on the tank. The cover 70 may also have a pressure gauge 74. The type of vertical vent arrangement with a cover as shown in FIG. 6 is typical of a combination vent arrangement found on tank trucks or similar types of transport vehicles used for transporting bulk liquid cargo. The cover 70 connects a vertical overhead pipe 62 to overhead air supply piping and is sometimes referred to in the trucking industry as a "Christmas tree."

When installed, the device 10 is secured vertically in a fixed position within a vertical section of pipe 62 connected to a top side of a tank 60, as shown in FIG. 6. The vertical section of pipe 62 is in fluid communication with the interior of the tank 60 where liquid cargo is contained. The apertures 16 in each of the plurality of baffle plates 14 allow air to flow through the device 10 in either direction to allow air to be supplied to the tank 60 and to vent the tank, as necessary. However, when a wave of sloshing liquid moves upward in the tank and contacts the device 10, the liquid must flow through the apertures 16 of each of the plurality of baffle plates 14 in succession before the liquid may enter the overhead piping 72 that is fluidly connected to the interior of the tank 60 through the baffle plates. Thus, the baffle plates 14 restrict backflow of liquid due to liquid sloshing that occurs during transportation of liquid cargo contained in the tank 60. The device will thus prevent liquid accumulation inside overhead piping 72 used for connecting temporary air lines or for venting the tank.

The device 10 has a cylindrical housing 12 with a hollow interior with a plurality of baffle plates 14 spaced apart from each other and disposed within the interior of the housing 12 in a transverse configuration, as best seen in FIG. 4. Preferably, each baffle plate 14 is circular and is attached to an interior surface of the housing 12 around the entire circumference of each baffle plate 14. In a preferred embodiment, the device 10 is constructed of metal and the edges of each baffle plate 14 may be welded to the interior of the housing 12. Each baffle plate has a plurality of apertures 16 extending through the baffle plate to allow the flow of air through the device. In a preferred embodiment, as best seen in FIG. 4, the device 10 has four spaced baffle plates 14 each having four apertures 16 extending therethrough. The apertures 16 in adjacent baffle plates 14 are preferably offset from each other such that the apertures 16 in each baffle plate 14 are not longitudinally aligned with the apertures 16 of an adjacent baffle plate 14, as shown in FIG. 4. In the embodiment, shown in FIG. 4, there are two interior baffle plates having adjacent baffle plates on either side, and the apertures in these plates are preferably not longitudinally aligned with the apertures of either adjacent plate. This configuration of apertures 16 more effectively restricts backflow due to upwardly sloshing liquids.

The device 10 preferably includes an end cap 30 configured to removably secure to a bottom end of the device. As used herein, the "bottom end" and "top end" refer to the device when in the vertical position, as shown in FIG. 6. Thus, the bottom end is the end nearest the lowest baffle plate when the device is installed in a vertical pipe, and the top end is nearest the uppermost baffle plate. The end cap has openings 32 therein to allow air to pass through the cap. Thus, the end cap 30 may function as an additional baffle plate, but may be removed from the device to facilitate periodic cleaning of the device. FIG. 1 illustrates the device with the end cap 30 removed from the housing 12 of the device, while FIGS. 2 and 3 show the device with the end cap 30 firmly secured to the housing 12.

As best seen in FIG. 4, the device 10 preferably has a rod 18 extending longitudinally through the center of the device 10 through each of the baffle plates 14. A bottom end of the rod 18 has male threads 24, and the end cap 30 has a nut 26 having female threads compatible with the male threads 24 of the rod 18. The nut is preferably a castle nut 26 that is permanently attached to the end cap 30 so that the end cap may be secured to or removed from the device by threading the nut 26 onto or off of the rod 18. The device 10 may include a cotter pin 28 which may be inserted into a hole extending transversely through the male threaded section 24 of the rod 18. The hole in the rod is positioned such that the cotter pin can be inserted through gaps in the castle nut 26 and through the hole when the end cap 30 is fully tightened securely against the bottom end of the housing 12, as shown in FIG. 2, which is the position of the end cap during normal operation of the device. The cotter pin 28 may prevent the end cap 30 from becoming loose and potentially coming off of the device during use.

The device 10 preferably includes a handle 20 attached to the top end of the rod 18, as seen in FIGS. 3 and 4. The handle 20 may be used by an operator to insert the device into a pipe 62 for installation or to pull the device out of the pipe for removal. The handle preferably has a "T" shape for safety purposes so that an operator's fingers cannot become trapped in the handle when installing or removing the device. When the device is installed, as shown in FIG. 6, the device is in a vertical, upright position such that the handle 20 is at the top end of the device and the end cap 30 is at the bottom end of the device.

As shown in FIG. 1, the device 10 preferably has a flange 34 extending outwardly near the top end of the housing 12 for removably securing the device within an interior of a pipe. The flange 34 is sized to secure the device 10 in a fixed position within the interior of a pipe with the flange positioned between two adjacent sections of pipe connected to each other. Thus, when the device is installed, the flange 34 is fitted securely between two sections of piping 62 and 70 to hold the device in place within the vertical pipe 62. As shown in FIG. 6, when the device 10 is inserted into a vertical overhead pipe 62 on a tank 60, the flange 34 contacts a top edge 64 of the pipe 62 to prevent the device from falling downward through the pipe 62 and into the tank 60. In addition, when the cover 70 is secured to the top of the pipe 62, an edge 78 around the inside of the cover 70 having a smaller diameter than the portion of the cover 70 that fits over the top of the pipe 62 contacts a top side of the flange 34. Thus, securing the cover 70 to the pipe 62 secures the flange 34 in place between edges 64 and 78, which secures the device 10 in a fixed position within the interior of the pipe 62. Gaskets may be installed on one or both sides of the flange 34 to ensure a secure, sealed fit.

In a preferred embodiment, the device 10 further comprises flexible supports 36 to assist in removably securing the device within the interior of the pipe 62. Each support 36 is attached at a lower end 46 to an exterior surface of the tubular housing 12. The supports 36 are resiliently biased in an outward radial direction. The supports are preferably constructed of a material that is relatively rigid but has some flexibility such that the supports may bend inward slightly when the device is inserted into a pipe for installation. Thus, when the device is installed, as shown in FIG. 6, the supports 36 contact an interior surface 66 of the pipe 62 to help secure the device in place by limiting rotational and axial movement within the pipe. As best seen in FIG. 4, each support 36 has an upper end 44 that may be angled inward so that the upper end 44 contacts the exterior surface of the housing 12 when the supports 36 contact the interior surface 66 of the pipe 62. Thus, the angled portion of the upper end 44 provides resistance to inward movement of the upper end 44, thereby assisting in keeping the device securely in place. The angled upper end 44 may also facilitate removal of the device 10 from the pipe 62 by reducing friction with the interior surface 66 of the pipe 62 when pulling the device out of the pipe by the handle 20.

As shown in FIG. 6, the supports 36 secure the housing 12 of the device in place such that there is a small gap 68 between the exterior of the housing 12 and the interior surface 66 of the pipe 62. This gap 68 allows air to flow through the device 10 in either direction by flowing through the openings 32 in the end cap 30, which may be located at least partially on the sides of the end cap, when the device is installed inside the pipe 62.

Figure 5:
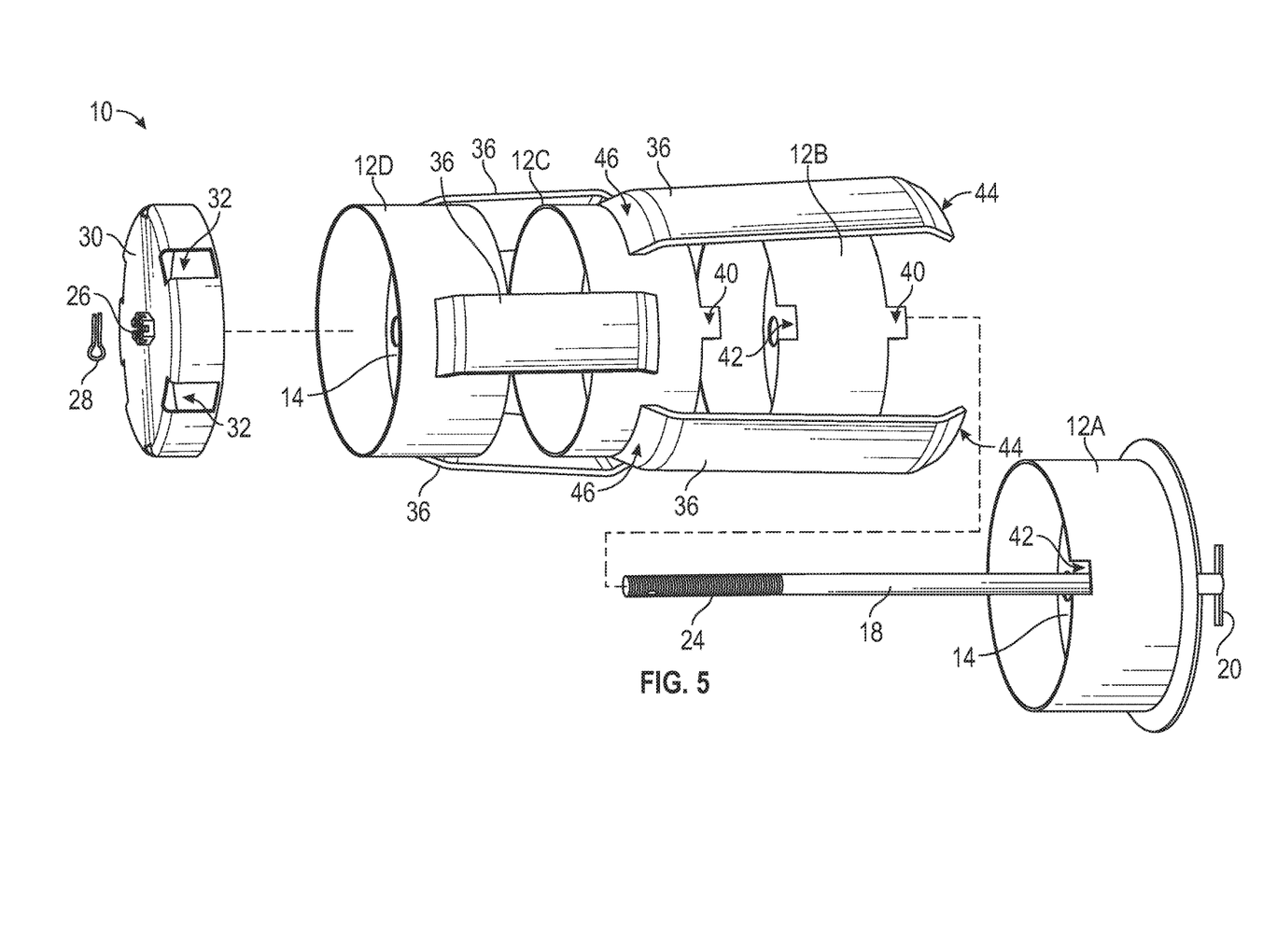
FIG. 5 shows an exploded view of a device for restricting backflow through an overhead line on a tank in accordance with the present disclosure

In a preferred embodiment, as shown in FIG. 5, the tubular housing 12 comprises a plurality of detachable housing segments 12A, 12B, 12C, and 12D configured to secure to each other to form the housing 12. By utilizing detachable housing segments, the device 10 may be disassembled to clean each individual baffle plate 14, if necessary. Each of the segments 12A, 12B, 12C, and 12D has one baffle plate 14 attached to an interior surface of the segment. As best seen in FIG. 5, adjacent segments may comprise interlocking male and female members 40 and 42 for securing the segments together. The male and female members 40 and 42 also ensure that the segments are properly aligned when assembling the device. As best seen in FIG. 4, the rod 18 preferably extends through the uppermost baffle plate 14 and is welded or otherwise permanently attached to the baffle at the center 22 of the baffle plate 14, which is attached to segment 12A, as shown in FIG. 5. The remaining baffle plates 14 each have a central opening 38 in the plate for inserting the rod 18 therethrough when assembling the device.

Thus, to assemble the device 10, the rod 18 is inserted through the opening 38 in segment 12B, and the male member 40 of segment 12B is inserted into female member 42 of segment 12A to align segments 12A and 12B and secure the segments to each other. This process is repeated next for segment 12C and then segment 12D (segment 12D has a male member and segment 12C has a corresponding female member that are not visible in FIG. 5 due to one of the supports 36 covering these members). The end cap 30 may then be threaded onto the male threads 24 of the rod 18, and the cotter pin 28 may be inserted through the castle nut 26 and the rod 18 to complete the assembly.

As shown in FIG. 5, the supports 36 are preferably attached to segments 12C and 12D at the lower end 46 of each support 36. As shown in FIG. 3, when the device 10 is assembled, the upper ends 44 of the supports 36 attached to segment 12C may contact the exterior of segment 12A when the supports are forced inward, and the upper ends 44 of the supports 36 attached to segment 12D may contact the exterior of segment 12B. Segments 12C and 12D preferably each have three equally spaced supports 36 attached to the exterior of the segment. The supports attached to segments 12C and 12D, respectively, are offset from each other so that the supports do not overlap when the device is assembled.

To install the device inside a pipe for use, the device 10 is first assembled and then inserted downward into a vertical overhead pipe 62 connected to the top side of a tank 60 until the flange 34 contacts the top edge 64 of the pipe 62. Once inserted, the supports 36 will contact the interior surface 66 of the pipe 62 to assist in firmly holding the device in place within the pipe. The handle 20 may be used for inserting the device, as well as for removing the device by pulling the device out of the pipe when needed. The cover 70 is then secured to the top end of the pipe 62 above the tank 60 so that the device 10 is secured in a fixed position within the interior of the pipe 62.

Once installed, the device 10 restricts backflow of liquid cargo from entering into overhead piping 72 connected to the top of a tank 60 on a transport vehicle due to liquid sloshing. When liquid sloshes in the tank due to motion of the transport vehicle, the liquid may slosh upward and contact the device 10 inside the vent pipe 62. When this occurs, the liquid first contacts the end cap 30, and some portion of liquid may flow through the openings 32 in the end cap and contact the lowest baffle plate 14 inside the device. Some portion of this liquid may then flow through the apertures 16 in the lowest baffle plate. However, in order for liquid to enter the overhead piping 72, the liquid must flow through the apertures 16 in each of the four baffle plates 14. Because each baffle plate 14 will decrease the amount of liquid flowing upward through the device, each additional spaced baffle plate disposed within the device reduces the probability of sloshing liquid flowing into overhead piping 72. Thus, the plurality of baffle plates disposed within the device restricts and effectively eliminates backflow due to sloshing.

Once the device and cover 70 are installed over the top opening of the pipe 62, air can flow through the device in both directions. Thus, air may be supplied to the tank 60 through the device via the air supply line 72 to supply air pressure inside the tank when offloading liquid cargo from the tank. Air may also be vented from the tank 60 through the device via the same piping 72 when loading liquid cargo into the tank 60. In order to achieve a sufficient air flow through the device 10, the number of apertures 16 and the size of the apertures in the baffle plates 14 may be varied. The required air flow for a particular application may depend on the diameter of the pipe 62, the size of the tank 60, the offloading rate of liquid cargo from the tank, and other factors.

The device is preferably sized such that the tubular housing 12 substantially conforms to an interior cross-sectional area of the pipe 62 when the device is installed within the pipe with only a small gap 68 between the exterior of the housing 12 and the interior surface 66 of the pipe 62 around the circumference of the housing. The supports 36 fit within the gap 68, which also allows air to flow through the openings 32 in the end cap 30. However, the diameter of the housing 12, as well as the positioning of the supports 36, may be varied to provide a gap 68 of a desired width necessary to achieve a sufficient air flow through the openings 32 in the end cap 30. Apertures may additionally be formed in the end cap to increase the air flow rate through the end cap, if necessary. The supports 36 spaced around the exterior of the housing 12 help to ensure that the gap 68 is maintained around the entire circumference of the housing. The gap 68 is preferably at least about ⅛ inch wide around the circumference of the housing 12.

Overhead pipes 62 on tank trucks are often either three or four inches in diameter, though the diameter may vary. In one preferred embodiment in which the device is installed inside a four-inch internal diameter pipe, the diameter of the housing 12 of the device is approximately 3¾ inches. However, it should be understood that the dimensions of the device may be varied in order to accommodate pipe openings of varying diameters and still fall within the scope of the present disclosure. The following device dimensions are preferred dimensions provided as an example only. The housing 12 of the device is preferably about six inches in length but may be varied depending on the length of the section of vertical pipe 62 in which it is installed. The device 10 is preferably sized so that it is enclosed by the pipe 62 and does not extend below the pipe into the interior of the tank. Four baffle plates 14 are preferably disposed at approximately equidistant intervals along the length of the body. The baffle plates are preferably made of 1/16 inch or 1/8 inch thick stainless steel. Preferably, at least the uppermost baffle plate and the lowest baffle plate may be made of 1/8 inch stainless steel to provide added support for the housing. The apertures 16 in the baffle plates are preferably 3/8 inches in diameter. The openings 32 in the end cap 30 are preferably about ½ inch wide. The handle 20 is preferably at least 1¼ inches high and 1¼ inches wide. The supports 36 attached to the exterior of the housing are preferably about two inches long and ½ inch wide. The supports 36 are preferably 1/16 inch thick and extend at least 1/8 inch from the exterior of the body of the device. It should be understood that the above dimensions are examples only and may be varied and still fall within the scope of the present disclosure. In addition, the number of baffle plates and the number of apertures in each baffle plate may also be varied and still fall within the scope of the present disclosure. All components are preferably made of stainless steel, aluminum, a suitable plastic material such as phenol formaldehyde resin, or any material of suitable strength that does not react with the liquid cargo being transported.

The flange 34 is preferably positioned about 1/8 inch from the top end of the housing 12 and preferably extends outwardly from the exterior of the housing about 3/16 inches to about ¼ inch such that the outer diameter of the flange is about 4⅛ inches to about 4¼ inches. The flange 34 is preferably made of about 1/16 inch stainless steel. In the case of an emergency in which a vacuum is pulled on the tank due to the device being clogged, or in which a vacuum is pulled too rapidly for adequate air flow through the device to eliminate the vacuum, the flange 34 is designed to bend in such a manner that the entire device 10 may be pulled into the tank 60 in order to relieve the vacuum. This feature provides protection against catastrophic tank failure in an emergency situation by eliminating the blockage of air flow through the device 10 located in the passageway connecting the interior of the tank with the interior of the cover 70. With the device removed from the pipe 62, the vacuum may be relieved either by pulling air through the air line 72, if possible, or by allowing the vacuum relief diaphragm 76 to function properly.

It is understood that versions of the invention may come in different forms and embodiments. Additionally, it is understood that one of skill in the art would appreciate these various forms and embodiments as falling within the scope of the invention as disclosed herein.

What is claimed is:

1. A device for restricting liquid backflow through an overhead line on a tank, said device comprising a tubular housing and a plurality of baffle plates disposed within an interior of the housing, wherein each baffle plate has at least one aperture therethrough, wherein the device has flexible supports configured to removably secure the device in a fixed position within an interior of a pipe, wherein the supports are attached to an exterior surface of the tubular housing, and wherein the supports are resiliently biased in an outward radial direction.

2. The device of claim 1, further comprising a flange sized to removably secure the device in a fixed position within an interior of a pipe.

3. The device of claim 1, wherein the at least one aperture of one of the plurality of baffle plates is not longitudinally aligned with the at least one aperture of an adjacent baffle plate.

4. The device of claim 1, wherein the tubular housing comprises a plurality of detachable segments configured to secure to each other to form the tubular housing.

5. The device of claim 4, wherein adjacent segments comprise interlocking male and female members.

6. The device of claim 1, further comprising an end cap configured to removably secure to a bottom end of the device, wherein the end cap has at least one opening therein.

7. The device of claim 1, wherein the device is sized such that the tubular housing substantially conforms to an interior cross-sectional area of a pipe when installed within the pipe.

8. The device of claim 1, wherein the device is disposed within an interior of a pipe connected to a top side of a tank and in fluid communication with an interior of the tank.

9. A method of restricting liquid backflow through an overhead line on a tank secured to a transport vehicle, said method comprising the steps of:

providing a device configured to removably secure the device in a fixed position within an interior of a pipe, said device comprising a tubular housing and a plurality of baffle plates disposed within an interior of the housing, wherein each baffle plate has at least one aperture therethrough; and installing the device within an interior of a pipe connected to a top side of a tank and in fluid communication with an interior of the tank.

10. The method of claim 9, wherein the device further comprises a flange sized to removably secure the device in a fixed position within the interior of the pipe, and wherein the step of installing the device within the interior of the pipe comprises installing the device such that the flange is fitted securely between two sections of the pipe.

11. The method of claim 9, wherein the device has flexible supports for removably securing the device in a fixed position within the interior of the pipe, wherein the supports are attached to an exterior surface of the tubular housing, wherein the supports are resiliently biased in an outward radial direction, and wherein the step of installing the device within the interior of the pipe comprises installing the device such that the supports contact an interior surface of the pipe.

12. The method of claim 9, wherein the at least one aperture of one of the plurality of baffle plates is not longitudinally aligned with the at least one aperture of an adjacent baffle plate.

13. The method of claim 9, wherein the tubular housing comprises a plurality of detachable segments configured to secure to each other to form the tubular housing, and wherein the method further comprises the step of securing the plurality of detachable segments to each other before the step of installing the device within an interior of a pipe.

14. The method of claim 13, wherein adjacent segments comprise interlocking male and female members, and wherein the step of securing the plurality of detachable segments to each other comprises interlocking the male and female members together.

15. The method of claim 9, wherein the device further comprises an end cap configured to removably secure to a bottom end of the device, wherein the end cap has at least one opening therein, and wherein the method further comprises the step of securing the end cap to the bottom end of the device.

16. The method of claim 9, wherein the device is sized such that the tubular housing substantially conforms to an interior cross-sectional area of the pipe when installed within the pipe.

17. A device for restricting liquid backflow through an overhead line on a tank, wherein the device is configured to removably secure the device in a fixed position within an interior of a pipe, said device comprising a tubular housing and a plurality of baffle plates disposed within an interior of the housing, wherein each baffle plate has at least one aperture therethrough, wherein the device is disposed within an interior of a pipe connected to a top side of a tank and in fluid communication with an interior of the tank.

* * * * *